United States Patent
Höschele et al.

(10) Patent No.: US 7,389,370 B2
(45) Date of Patent: Jun. 17, 2008

(54) COMMUNICATION MODULE

(75) Inventors: Ernst Höschele, Puchheim (DE); Peter Kastl, Schrobenhausen (DE); Georg Ahn, Augsburg (DE); Jochen Riedisser, Augsburg (DE)

(73) Assignee: Fujitsu Siemens Computers GmbH, Munich (DE)

( * ) Notice: Subject to any disclaimer, the term of this patent is extended or adjusted under 35 U.S.C. 154(b) by 391 days.

(21) Appl. No.: 11/039,561

(22) Filed: Jan. 20, 2005

(65) Prior Publication Data
US 2005/0193190 A1 Sep. 1, 2005

(30) Foreign Application Priority Data
Jan. 20, 2004 (DE) ...................... 10 2004 002 917

(51) Int. Cl.
*G06F 13/00* (2006.01)
(52) U.S. Cl. ...................... 710/104; 709/238
(58) Field of Classification Search ............... 710/104, 710/107; 709/238; 700/83
See application file for complete search history.

(56) References Cited

U.S. PATENT DOCUMENTS

| | | | |
|---|---|---|---|
| 5,818,428 A | 10/1998 | Eisenbrandt et al. | |
| 5,839,097 A | 11/1998 | Klausner | |
| 6,105,146 A * | 8/2000 | Tavallaei et al. | 714/2 |
| 6,166,734 A | 12/2000 | Nahi et al. | |
| 6,202,097 B1 * | 3/2001 | Foster et al. | 709/238 |
| 6,408,334 B1 | 6/2002 | Bassman et al. | |
| 6,697,254 B1 * | 2/2004 | King et al. | 361/687 |
| 6,845,277 B1 * | 1/2005 | Michelet et al. | 700/83 |
| 6,922,722 B1 * | 7/2005 | Mann et al. | 709/220 |
| 6,954,804 B2 * | 10/2005 | Lam et al. | 710/14 |
| 6,954,809 B2 * | 10/2005 | Kuo | 710/107 |
| 2004/0010647 A1 | 1/2004 | Chheda et al. | |
| 2004/0078456 A1 * | 4/2004 | Kennedy et al. | 709/223 |
| 2004/0148530 A1 | 7/2004 | Shyu | |
| 2005/0078106 A1 * | 4/2005 | Greenwood et al. | 345/211 |
| 2006/0125814 A1 * | 6/2006 | Asai et al. | 345/204 |

FOREIGN PATENT DOCUMENTS

| | | |
|---|---|---|
| DE | 20302484 U1 | 10/2003 |
| EP | 0 802 465 A2 | 10/1997 |

OTHER PUBLICATIONS

Search Report dated Apr. 3, 2007 issued for a corresponding European Patent Application No. 04 02 7793.

* cited by examiner

*Primary Examiner*—Clifford H Knoll
(74) *Attorney, Agent, or Firm*—Cohen Pontani Lieberman & Pavane LLP

(57) ABSTRACT

A computer system comprising a CPU, a data bus, components and a communication module for the administration of the CPU or components. The communication module comprises a data interface coupled to the data bus of the computer system. The user interface comprises a display unit and a control panel. A control unit is coupled to the user interface and the data interface for transmitting data to and from the CPU or components using the data bus. A memory is provided for the storage of configuration parameters and status information, which is coupled to the control unit via a memory bus. The communication module is adapted for obtaining system information of the components without using the CPU of the computer system and performing a configuration of the components using the configuration parameters.

9 Claims, 1 Drawing Sheet

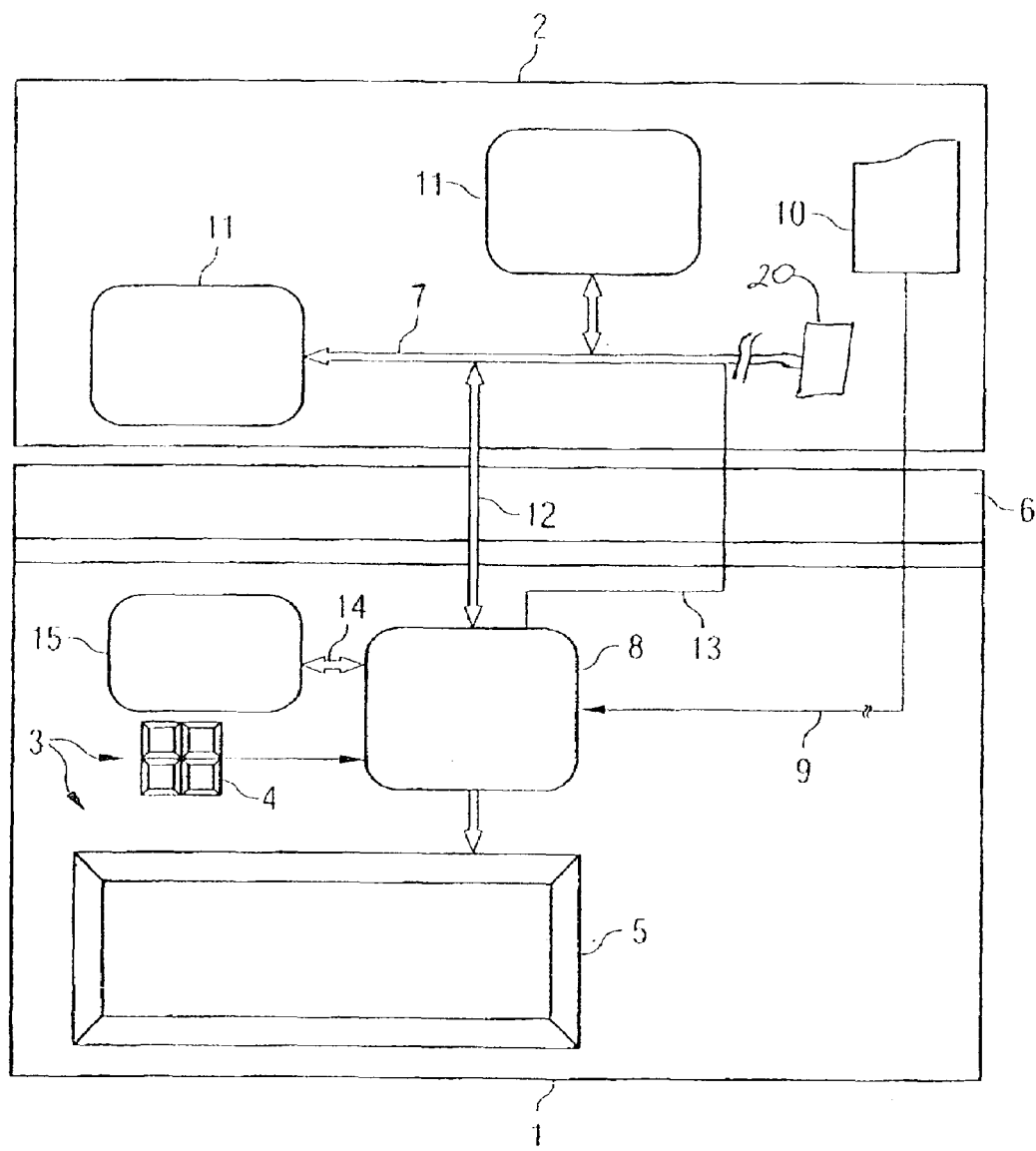

COMMUNICATION MODULE

CROSS-REFERENCE TO RELATED APPLICATIONS

This patent application claims the priority of German patent application 102004002917.2 filed 20 Jan. 2004, the disclosure content of which is hereby incorporated by reference.

FIELD OF THE INVENTION

The present invention relates to a computer system comprising a CPU, a data bus, components and a communication module for the administration of the CPU and components.

BACKGROUND OF THE INVENTION

Communication modules for unidirectional data communication are widely known as status displays, for example, for computer systems, notebooks, pocket PCs, mobile telephones, or manifold other devices, which display a battery status or a reception strength during operation of the devices, for example. In the status displays which are typically currently used, LEDs are frequently used in order to identify a status, particularly to identify whether a device is turned on or off. Thus, a red LED may display a standby mode and a green LED may display an operating mode, for example.

The current status displays are distinguished in that the device in which the status display is operated relays system data of the device to display a status at the status display.

Status displays which have a display unit, such as a display, are capable of displaying alphanumeric and also graphic data. Transmission of system data for display on the display is typically performed in real time, so that the data is processed by at least one processor of the device and/or computer system and the processed data must be forwarded to the display. Therefore, this processor is loaded with the handling of the user interface, in this case the display unit, in addition to its tasks in regard to data processing. Intelligent status displays in particular lead to a high system load of the computer system.

Until now, status displays have therefore merely been used to display predefined system information. There is no possibility of using them as input devices which allow active configuration and display of the system parameters which may be performed by the user at any arbitrary time.

SUMMARY OF THE INVENTION

One object of the present invention is to provide status displays that enable bidirectional data communication between the status display and the computer system, the system load of the computer system not being significantly elevated.

This and other objects are attained in accordance with one aspect of the present invention directed to a computer system comprising a CPU, a data bus, components and a communication module for the administration of the CPU or components. The communication module comprises a data interface coupled to the data bus of the computer system. The user interface comprises a display unit and a control panel. A control unit is coupled to the user interface and the data interface for transmitting data to and from the CPU or components using the data bus. A memory is provided for the storage of configuration parameters and status information, which is coupled to the control unit via a memory bus. The communication module is adapted for obtaining system information of the components without using the CPU of the computer system and performing a configuration of the components using the configuration parameters.

To display status information, such as the battery charge state or operating status of the computer system, the display unit advantageously has predefined display fields. These display fields are automatically updated by hardware components integrated into the computer system. A selection of known symbols typically available on the market may be integrated into the display field, which are activated directly via lines connected to the display unit. To display customer-specific defined symbols on the display unit, which are preferably stored in a memory and can be altered by the manufacturer or the user by changing the content of the memory, the control unit has control lines, via which a control signal generated by the components may be transmitted to activate the corresponding symbols on the display unit. The symbols are thus pre-configured by the manufacturer of the display unit and display, for example, a status in regard to access of a hard drive, a system error, a temperature status, a battery status, or an active LAN connection.

Using the control panel, which can comprise, for example, a group of function keys integrated into the display unit of the communication module, it is possible for a user to actively call system information of further statuses of the computer system. Furthermore, configurations of the computer system, such as the alteration of system parameters or the selection of a boot medium, e.g., whether to boot the computer system from an integrated storage device or a boot service provided via a network connection, may be performed. For this purpose, the control unit has an interrupt line, which is connected to the data interface and via which an interrupt signal generated by the control unit may be applied to the data interface. A corresponding interrupt signal leads to the display of status and/or configuration information of the hardware and software components integrated in the computer system. In addition, a corresponding interrupt signal having specific input parameters leads to processing by processors positioned in the computer system on a main board, for example, which perform a desired configuration of the hardware and software components of the computer system. Because of this interrupt signal, an asynchronous interrupt, the desired information is actively called from the communication module. In addition to this active calling of information, it is also possible for a user to execute system administration functions, such as the configuration of system parameters or the transmission of test sequences, from the communication module, so that the system load may be kept low.

In another embodiment, the control panel allows a user-specific configuration of the display unit for graphic and alphanumeric representation and/or display of the information. Thus, the configuration and arrangement of any arbitrary symbols and alphanumeric data is conceivable, as is the determination of the sequence and fixing of the time intervals of information to be shown or called.

Status displays, such as the instantaneous battery status, may also be displayed in the idle status of the computer system, for example, in a standby mode.

If the display unit is a programmable, non-volatile display, such as a ferroelectric liquid crystal display, it has the property that, similarly to an LCD display, it may display different changeable graphics while power is supplied and maintains the last graphic displayed in the non-powered status.

All information called and/or system administration actions performed are advantageously stored in the memory, which is connected to the control unit via a bus interface. Therefore, the data in the memory may be called at any time and shown on the display unit, so that, for example, configurations performed earlier in time, both of the computer system and of the communication module, test results, or system parameters are reproducible. Furthermore, the memory may have freely describable regions, which, for example, maintain test or maintenance programs or manufacturer-specific or user-specific information for execution and/or display.

BRIEF DESCRIPTION OF THE DRAWING

FIG. 1 shows a schematic illustration of a computer system with an integrated communication module according to the present invention.

DETAILED DESCRIPTION OF THE DRAWING

FIG. 1 schematically shows a computer system with a communication module 1 according to the present invention and its connection to a main circuit board 2 of the computer system. The communication module 1 has a user interface 3, which comprises a control panel 4, e.g., a small keyboard and a display unit 5. For contact to the main circuit board 2 of the computer system, the communication module 1 has a data interface 6. The data interface 6 may be implemented, for example, as an inter-integrated circuit bus interface (12C) coupled to a data bus 7 of the computer system, such as a system management bus (SMBus). The SMBus 7 is also in communication with a central processing unit (CPU) 20, a hardware component 10, and software components 11. As shown in FIG. 1. the CPU 20 and the SMB bus 7 are disposed on the main circuit board 2. For the connection between the data interface 6 and the SMBus 7, a flexible cable (not shown here) positioned on the communication module 1 may be provided with a plug which contacts a corresponding plug on the main circuit board 2.

Furthermore, the communication module 1 comprises a control unit 8, which is connected to the user interface 3 and the data interface 6 of the communication module 1 and which controls a bidirectional dataflow to and from the computer system. A status of a component 10 of the computer system, such as the charge state of the battery or an operating temperature of processors, may be transmitted using control signals from the component 10 to the communication module 1 using one or more control lines 9, which are connected to the control unit 8 and, through the data interference 6, to the component 10 of the computer system. The transmitted status information of the component 10 can then be shown on the display unit 5. For this purpose, the display unit 5 has symbols (not shown here), which are pre-configured by a manufacturer of the display unit 5 and may be altered by a user using software. The state of these display fields are updated automatically, since in the event of a corresponding status change of the components 10, the control unit 8 is activated and therefore the symbols of the display unit 5 are updated by the communication module 1.

In a further embodiment, the display unit 5 comprises a set of fixed symbols predefined by the manufacturer. The display unit 5 is activated directly to display such symbols, which cannot be changed by the user, via connections (not shown here) of the display unit 5 to the components 10.

Further status and/or configuration information, which may be transmitted via data lines 12 of the data interface 6, of further hardware and software components 11 integrated into the computer system may be called via the control panel 4 of the communication module 1. In the event of a corresponding input by a user to call information, the control unit 8 feeds an interrupt signal to the data bus 7 of the computer system via an interrupt line 13 positioned on the control unit 8 and connected through the data interface 6 of the communication module 1, the control unit 8 performing a readout and/or determination of the desired information. Via the control panel 3, the user may also initiate system inputs, such as a configuration of system parameters of the hardware and software components 11, which are executed by the control unit 8. The bidirectional data communication occurs in each case via the data lines 12. Furthermore, a user-specific configuration of the display unit 5 to show the desired information is made possible.

The control unit 8 is connected via a memory bus 14 to the memory 15, in which all information called by the control unit 8 and configuration parameters are stored. Furthermore, user-specific data, such as the logo of a company or the computer name, which may be called as desired by a user, may be stored in a memory region of the memory 15. Test routines stored in the memory 15 may be activated by the user via the control panel 3 to perform specific tests. In case of error, maintenance programs stored in the memory 15 may be executed for fault location.

A non-exclusive list of possible system administration functions, which are executable in the control unit using the configuration module 1 and are displayable on the display unit 5, is as follows:

calling hardware parameters (MAC address, computer name, asset number, etc.), calling configuration parameters (IP address, LAN speed, etc.), calling status parameters (temperature, fan speed, hard drive accesses, power consumption, error codes, power supply, etc.), calling and/or loading user-specific parameters (customer-specific data, deadlines, Outlook messages), calling test results (self test, special test routines, etc.), configuration of the communication module originating from the computer system, configuration of the display unit to show all information called and/or stored, configuration of system parameters of the computer system, initiating test routines, maintenance programs, etc., and selecting media to be used (boot medium, etc.).

These and other functions may be achieved by reading out values of registers of the components 10, 11 or BIOS settings stored on the main circuit board 2 of the computer system and/or updating such values. For example, the temperature of the CPU of the computer system can be displayed on the display unit 5 by reading the register corresponding to the current temperature of a sensor placed on the main circuit board below the CPU. Another example would comprise the updating of the BIOS setting controlling the device which is used for the next boot process, possibly followed by triggering a reset of the computer system.

To allow a flexible design for these and other functions provided by the communication module 1, the controller unit 8 can be implemented using a standard micro-controller and a program running on this micro-controller. The program can be stored in a special instruction memory of the micro-controller or the memory 15 of the communication module 1. In this way the control unit 5 of the communication module 1 can be updated to add new functionality by uploading a new version of the control program. In this case the memory used to store the control program must be non-volatile or backed up by a power source such as a battery.

If the functionality provided is fixed, i.e., if updates of it are not desired or allowed, the control unit can also be implemented using a customizable chip, like an application specific integrated circuit (ASIC) or a programmable array logic (PAL) component.

The communication module described above allows bidirectional data communication with a computer system, the computing power for system information to be called and/or configurations to be performed being provided by the control unit integrated into the communication module. The system load of the processors positioned on the main circuit board is, therefore, not significantly elevated to execute these tasks. System administration functions may be executed without the typical components to be used, such as a monitor or keyboard. Therefore, both backup and restore of stored information are made possible.

The scope of protection of the invention is not limited to the examples given hereinabove. The invention is embodied in each novel characteristic and each combination of characteristics, which includes every combination of any features which are stated in the claims, even if this combination of features is not explicitly stated in the claims.

The invention claimed is:

1. A computer system comprising:
 a CPU;
 an integrated system management bus;
 a plurality of components; and
 an integrated communication module for the administration of the CPU or the plurality of components, wherein the CPU and the system management bus are located on a common main circuit board and the communication module is located on a separate circuit board, the communication module comprising:
 a data interface coupled to and in communication with the system management bus of the computer system;
 a user interface comprising a display unit for displaying status information and a control panel for inputting user information;
 a control unit coupled to and in communication with said user interface and said data interface for transmitting data to and receiving data from the CPU or components using the system management bus; and
 a memory for the storage of configuration parameters, status information, and predefined display signals, the memory being coupled to said control unit via a memory bus;
 wherein the communication module is adapted to obtain system information about the components and display on the display unit associated predefined display symbols stored in the memory and perform a configuration of the components using said configuration parameters without using the CPU, a keyboard, or a monitor of the computer.

2. The computer system according to claim 1, wherein the control unit is connected to at least one control line, via which a control signal to display an operating status of predefined components of the computer system on the display unit is provided automatically.

3. The computer system according to claim 1, wherein the control unit is connected to at least one interrupt line, via which an interrupt signal is fed to the CPU or the components via said data interface.

4. The computer system according to claim 1, wherein the data interface is based on the inter-integrated circuit bus (I2C bus) system and is coupled to the system management data bus integrated into the computer system.

5. The computer system according to claim 1, wherein said display unit has pre-configured graphic symbols, via which the operating status of the components of the computer system is displayed.

6. The computer system according to claim 1, wherein said display unit is a ferroelectric liquid crystal display.

7. The computer system according to claim 1, wherein the display unit is an LCD display.

8. The computer system according to claim 1, wherein the display unit has a background illumination.

9. The computer system according to claim 1, wherein the control panel is integrated into the display unit.

* * * * *